United States Patent [19]

Parks et al.

[11]  4,299,804

[45]  Nov. 10, 1981

[54] REMOVAL OF MAGNESIUM AND ALUMINUM IMPURITIES FROM WET PROCESS PHOSPHORIC ACID

[75] Inventors: Kenneth L. Parks, Lakeland, Fla.; Kyle D. Clevenger, Baton Rouge, La.; Daniel P. McDonald, Yazoo City, Miss.

[73] Assignee: Agrico Chemical Company, Tulsa, Okla.

[21] Appl. No.: 884,823

[22] Filed: Mar. 9, 1978

[51] Int. Cl.³ ............................................. C01B 25/16
[52] U.S. Cl. ................................................ 423/321 R
[58] Field of Search .......................... 423/321 R, 321 S

[56] References Cited

U.S. PATENT DOCUMENTS

| 3,379,501 | 4/1968 | Treitler et al. | 423/321 R |
| 3,494,736 | 2/1970 | Carothers et al. | 423/321 R |
| 3,800,029 | 3/1974 | Omoto et al. | 423/321 R |
| 4,136,199 | 1/1979 | Mills | 423/321 R |

FOREIGN PATENT DOCUMENTS 1220223  1/1971  United Kingdom ............ 423/321 R

OTHER PUBLICATIONS

Lehr, Fluorine Behavior in WPA Production, pp. 1–20, Paper Presented at Aiche Meeting in Bartow, Fla. on 2/8/77.

Frazier et al., Chemical Behavior of Fluorine in WPA, Environmental Science & Tech., vol. 11, No. 10, 10/77, 1st Presented 8/75.

Primary Examiner—O. R. Vertiz
Assistant Examiner—Gregory A. Heller
Attorney, Agent, or Firm—Richards, Harris & Medlock

[57]  ABSTRACT

Magnesium and aluminum impurities may be removed from wet process phosphoric acid by adding a fluoride ion donating compound, such as hydrofluoric acid, for example, to thereby provide about four fluoride ions for each aluminum ion. Also, preferably, an aluminum ion donating compound, such as alum is added to the wet process acid to bring the aluminum ion to magnesium ion ratio up to about two to one to facilitate formation of crystalline compounds having the general stoichiometry $MgAl_2F_8$. The treated filter grade acid is then further treated in a crystallizer to form large crystals which will readily precipitate so the purified liquid phase, low in magnesium and aluminum containing impurities, may be separated from the crystalline phase.

16 Claims, No Drawings

1

REMOVAL OF MAGNESIUM AND ALUMINUM IMPURITIES FROM WET PROCESS PHOSPHORIC ACID

BACKGROUND OF THE INVENTION

One process for the preparation of phosphoric acid is known as the "wet process". This process involves the acidulation of phosphate rock with a mineral acid such as sulfuric, phosphoric or nitric to produce the phosphoric acid. During acidulation of the rock there will be formed, in addition to the phosphoric acid, a solid precipitate. If sulfuric acid is the digesting acid the precipitate will include gypsum as its major constituent. In the conventional dihydrate process the aqueous phosphoric acid may be separated from the precipitate by filtration to produce a dilute or unconcentrated filter grade phosphoric acid product usually containing from 25–33% $P_2O_5$. The resulting filter cake is countercurrently washed and eventually discharged. The filtrate from the cake washings are used as future cake washing solutions or are returned to the reaction section.

Phosphate rock contains various amounts of impurities and the level of impurities found in many remaining phosphate deposits is increasing. Among the increasing impurities are magnesium and/or aluminum containing compounds. When the phosphate rock is digested with sulfuric acid, as discussed above, the metal compounds (usually salts and oxides of the metal) may readily go into solution. These impurities may then form precipitates and settle out as solids or sludge over a period of many days or even months. The filtration rate of liquids containing dissolved metal ions and finely divided solids is low and the filter media is easily clogged. The metal ion containing impurities are difficult and costly to remove from the phosphoric acid because when precipitated they may carry with them very appreciable quantities of valuable $P_2O_5$ which is so combined that it cannot be effectively removed by leaching with water or dilute acid.

Further, when the phosphoric acid (25–33% $P_2O_5$) is concentrated the solubility of many of the initially soluble impurities may be exceeded and further precipitation occurs. Also problems may exist when the phosphoric acid is neutralized, or otherwise treated, as for example in the manufacture of liquid plant food, wherein wet process phosphoric acid and ammonia are reacted to produce a substantially neutral solution for use as a liquid plant food base. During the neutralization of the acid which contains the dissolved impurities the precipitation of sludge, especially magnesium containing salts, can occur. These impurities act to form deposits which may clog the transfer and distribution equipment. These impurities also result in loss of $P_2O_5$ values and these sludges may hinder the removal of other types of impurities.

Various methods have been suggested in the prior art to obtain a more pure form of phosphoric acid. According to U.S. Pat. No. 3,935,298 iron impurities can be removed by mixing an alkali metal halide with the starting phosphate rock and firing the mixture at a temperature of 300 to 1100° F. of before acidulation. U.S. Pat. No. 3,562,769 teaches the use of alkali metal salts as disintegration-preventing agents which can be used to retain impurities in a solid state while phosphoric acid is extracted, while U.S. Pat. No. 3,408,162 discloses that by adding a relatively small amount of an alkaline salt of lignosulfonic acid to the wet process phosphoric acid solid impurities may be maintained in suspension and crystal growth may be inhibited. U.S. Pat. No. 3,554,694 discloses use of a sodium salt addition in order to remove the fluorine present and obtain a commercially pure sodium fluosilicate.

Other methods exist for the removal of aluminum. U.S. Pat. No. 3,843,767 shows treatment of the original ore with pure phosphoric acid to obtain a low concentration of aluminum and iron impurities. U.S. Pat. No. 2,954,287 shows the use of sulfuric acid in combination with alkali salts in order to keep free aluminum concentration low. In another process, shown in U.S. Pat. No. 2,494,736, silicon is first removed and then fluorine and sodium are added to form a crystalline sodium/aluminum/fluorine salt that is easily separable. One other process deals with the recovery of fluorine from phosphate ore which involves precipitating aluminum and fluorine in the form of fluoaluminate. See, for details, U.S. Pat. No. 3,512,927.

German Patent Application No. 2,046,295, based on U.S. patent application Ser. No. 866,752, recommends the addition of a source of soluble fluoride to wet process acid to precipitate magnesium impurities as magnesium-aluminum-fluoride salts. It proposes that the precipitation be induced in concentrated (45–53% $P_2O_5$) wet process acid to avoid competition between silicon and aluminum for the added fluoride ion. However, the high viscosity of concentrated wet process acid makes phase separation difficult. Further, the process recommends adjustment of the aluminum to magnesium mole ratio to at least 1.11 and preferably 2.37 to 9.48. The fluoride to magnesium mole ratio is recommended to be at least 4.67 and preferably between 6.37 and 25.5.

It is believed that the foregoing processes have not obtained a high efficiency and that they tend to be heavily burdened with capital expense necessary for production equipment. The techniques involving precipitation of impurities have advantages over other potential purification techniques due to the simplicity and compatibility with existing phosphoric acid facilities. However, precipitated impurities within the acid can settle out to damage equipment and clog filters and they are responsible for a substantial loss of $P_2O_5$ values.

It is therefore desired to obtain better quality phosphoric acid, and it is also desired to be able to remove the impurities in as large a quantity and as early in the process as is possible, without encountering substantial processing problems.

SUMMARY OF THE INVENTION

The invention generally relates to a method of removing magnesium and aluminum impurities from wet process phosphoric acid by adding to unconcentrated wet process acid a fluoride ion donating compound to create a fluoride ion to aluminum ion ratio between about 3.5/1 and 7/1 to permit formation of insoluble crystalline compounds having a stoichiometry ranging between $MgAl_2F_8$ and $MgAlF_5$. In a preferred embodiment the fluoride ion donating compound is added after separating the wet process acid from the gypsum slurry.

In some cases an aluminum ion donating compound is also added to the unconcentrated acid in an amount sufficient to bring the aluminum ion to magnesium ion ratio to between about 1.1/1 and 2.0/1. The unconcentrated acid may then be directed to a crystallizer to permit growth of crystals which will readily precipitate and permit removal from a wet process phosphoric acid having controlled amounts of magnesium and aluminum impurities.

PREFERRED EMBODIMENT

Those skilled in the art of producing phosphoric acid by the "wet process" know that the composition of "wet process" acid is dependent upon the nature of the phosphate rock used in the process of producing the acid, but that most acids will contain unwanted impurities including magnesium and aluminum containing impurities which, if not remove, can slowly precipitate and settle out of the acid to form a sludge which can cause the acid to have a gelatinous property.

In accordance with the present invention it is possible to reduce the magnesium content of filter grade wet process acid (of magnesium salts which by conventional wet chemical analysis are expressed as MgO) to about 200 p.p.m. or lower, as well as reducing the aluminum content to low levels.

This reduction of magnesium and aluminum impurities from wet process acid is preferably accomplished after the phosphate rock has been acidulated by a mineral acid, such as sulfuric acid, and the solids, predominately gypsum, removed by filtration or settling. To the "filter grade" wet process acid (that acid which passes through the filter used to remove gypsum) which normally contains between 25 and 33% $P_2O_5$, but may contain up to about 40% $P_2O_5$ is added a fluoride ion donating compound such as hydrofluoric acid, sodium fluoride, sodium bifluoride, ammonium fluoride or ammonium bifluoride. While hydrogen fluoride gas may be used, it is not preferred for safety reasons. $H_2SiF_6$, $Na_2SiF_6$ and $Na_3AlF_6$ were tested as possible sources of fluoride ion, but did not yield the preferred effects.

In order to demonstrate the relative effectiveness of the fluoride donating compounds the following Tables 1-5 are provided. To obtain the data set out in the tables, the following test procedures were employed:

1. MgO and $MgCO_3$ were added to "filter grade" wet process acid to produce acids having different MgO content which might be representative of acids expected to be produced from phosphate ores which might be mined at different locations throughout the world.

2. Weighed amounts of the fluoride ion donating compound were added to weighed amounts of the above "filter grade" wet process acid and the solutions were vigorously shaken and stored overnight (16–20 hours) at 60° C.

3. The liquid phase was separated by centrifugation and submitted for analysis of major components by conventional techniques.

The results of these tests were as follows:

TABLE I

| Filter Grade Wet Process Acid Sample Number | Grams NaF/50 Grams of Acid | Solids Free Liquid Phase Analysis After 16 Hours at 60° C. | | | | |
|---|---|---|---|---|---|---|
| | | %$P_2O_5$ | %MgO | %$Al_2O_3$ | %$Na_2O$ | %F |
| 1 | 0 | 30.32 | 0.51 | 0.96 | 0.017 | 1.96 |
| | 0.5 | 30.35 | 0.51 | 0.83 | 0.034 | 1.09 |
| | 1.0 | 30.74 | 0.46 | 0.63 | 0.40 | 0.80 |
| | 1.5 | 30.48 | 0.35 | 0.43 | 0.35 | 0.81 |
| 2 | 0 | 30.03 | 0.95 | 0.94 | 0.017 | 1.90 |
| | 0.5 | 30.55 | 0.87 | 0.83 | 0.047 | 1.04 |
| | 1.0 | 30.60 | 0.85 | 0.79 | 0.21 | 0.81 |

TABLE I-continued

| Filter Grade Wet Process Acid Sample Number | Grams NaF/50 Grams of Acid | Solids Free Liquid Phase Analysis After 16 Hours at 60° C. | | | | |
|---|---|---|---|---|---|---|
| | | %$P_2O_5$ | %MgO | %$Al_2O_3$ | %$Na_2O$ | %F |
| | 1.5 | 30.15 | 0.81 | 0.63 | 0.42 | 1.09 |
| 3 | 0 | 29.81 | 1.39 | 0.83 | 0.016 | 1.79 |
| | 1.0 | 30.05 | 1.31 | 0.74 | 0.19 | 0.90 |
| | 1.5 | 30.00 | 1.22 | 0.56 | 0.42 | 1.00 |
| | 2.0 | 29.49 | 1.16 | 0.46 | 0.65 | 1.18 |
| 4 | 0 | 29.55 | 1.87 | 0.85 | 0.020 | 1.09 |
| | 1.5 | 29.40 | 1.74 | 0.68 | 0.48 | 1.25 |
| | 2.0 | 29.30 | 1.55 | 0.43 | 0.61 | 1.38 |
| | 2.5 | 29.15 | 1.31 | 0.26 | 0.80 | 1.29 |
| 5 | 0 | 29.30 | 2.32 | 0.85 | 0.056 | 1.60 |
| | 2.0 | 29.33 | 1.95 | 0.41 | 1.69 | 1.00 |
| | 2.5 | 28.75 | 1.76 | 0.30 | 2.21 | 1.16 |
| | 3.0 | 28.75 | 1.53 | 0.26 | 2.50 | 1.29 |
| 6 | 0 | 29.55 | 2.84 | 0.85 | 0.061 | 1.58 |
| | 2.5 | 29.40 | 2.01 | 0.35 | 2.36 | 0.94 |
| | 3.0 | 28.55 | 1.84 | 0.56 | 5.06 | 1.15 |

TABLE II

| Filter Grade Wet Process Acid Sample Number | $A^1$ | $B^2$ | Solids Free Liquid Phase Analysis After 16–20 Hours at 60° C. | | | | |
|---|---|---|---|---|---|---|---|
| | | | %$P_2O_5$ | %MgO | %$Al_2O_3$ | %$Na_2O$ | %F |
| 1 | 0 | 0 | 30.26 | 0.55 | 0.88 | 0.057 | 1.84 |
| | 0.6 | 0.2 | 30.10 | 0.41 | 0.73 | 0.088 | 1.83 |
| | 1.2 | 0.6 | 30.30 | 0.062 | 0.11 | 0.077 | 1.16 |
| | 1.5 | 0.7 | 30.14 | 0.041 | 0.047 | 0.065 | 1.16 |
| 2 | 0 | 0 | 29.90 | 0.94 | 0.78 | 0.051 | 1.83 |
| | 0.5 | 0.2 | 29.94 | 0.96 | 0.75 | 0.082 | 1.92 |
| | 1.1 | 0.5 | 30.24 | 0.59 | 0.29 | 0.17 | 1.47 |
| | 1.5 | 0.7 | 30.14 | 0.29 | 0.036 | 0.074 | 0.95 |
| 3 | 0 | 0 | 30.14 | 1.32 | 0.78 | 0.048 | 1.83 |
| | 1.0 | 0.5 | 29.86 | 1.16 | 0.39 | 0.18 | 1.49 |
| | 1.5 | 0.7 | 30.10 | 0.83 | 0.23 | 0.31 | 1.50 |
| | 2.0 | 1.0 | 29.74 | 0.62 | 0.20 | 0.34 | 1.63 |
| 4 | 0 | 0 | 29.74 | 1.55 | 0.78 | 0.044 | 1.83 |
| | 2.1 | 1.0 | 28.74 | 1.35 | 0.49 | 0.38 | 2.11 |
| | 2.5 | 1.2 | 29.30 | 1.14 | 0.37 | 0.43 | 1.83 |
| | 3.0 | 1.5 | 28.94 | 0.93 | 0.26 | 0.63 | 1.94 |
| 5 | 0 | 0 | 29.40 | 1.97 | 0.75 | 0.052 | 1.83 |
| | 2.1 | 1.0 | 29.00 | 1.66 | 0.56 | 0.48 | 2.14 |
| | 2.5 | 1.2 | 28.46 | 1.45 | 0.47 | 0.63 | 2.31 |
| | 3.0 | 1.5 | 28.94 | 1.13 | 0.39 | 0.86 | 2.31 |
| 6 | 0 | 0 | 29.84 | 2.59 | 0.75 | 0.046 | 1.84 |
| | 2.5 | 1.2 | 29.00 | 1.76 | 0.50 | 0.59 | 2.19 |
| | 3.0 | 1.7 | 28.54 | 1.45 | 0.42 | 1.19 | 2.47 |
| | 3.5 | 1.7 | 28.14 | 1.55 | 0.55 | 1.19 | 3.28 |

[1]Grams of 49% HF solution per 50 grams Filter Grade Wet Process Acid
[2]Grams of NaF per 50 grams of Filter Grade Wet Process Acid

TABLE III

| Filter Grade Wet Process Acid Sample Number | Grams of 49% HF Solution 50 Grams Of Acid | Solids Free Liquid Phase Analysis After 16–20 Hours at 60° C. | | | | |
|---|---|---|---|---|---|---|
| | | %$P_2O_5$ | %MgO | %$Al_2O_3$ | %Sol. $SiO_2$ | %F |
| 1 | 0 | 30.40 | 0.49 | 1.02 | 0.99 | 1.80 |
| | 0.9 | 29.60 | 0.49 | 0.97 | 0.96 | 2.40 |
| | 1.8 | 29.80 | 0.0082 | 0.14 | 1.00 | 2.10 |
| | 3.0 | 28.80 | 0.0037 | 0.10 | 1.04 | 2.75 |
| 2 | 0 | 29.40 | 0.93 | 1.02 | 1.00 | 1.75 |
| | 1.0 | 29.00 | 0.90 | 1.02 | 1.00 | 2.50 |
| | 1.7 | 28.80 | 0.45 | 0.30 | 1.03 | 2.60 |
| | 3.0 | 28.60 | 0.84 | 0.58 | 1.04 | 3.00 |
| 3 | 0 | 30.00 | 1.40 | 0.77 | 0.96 | 1.80 |

TABLE III-continued

| Filter Grade Wet Process Acid Sample Number | Grams of 49% HF Solution 50 Grams Of Acid | Solids Free Liquid Phase Analysis After 16-20 Hours at 60° C. | | | | |
|---|---|---|---|---|---|---|
| | | %P$_2$O$_5$ | %MgO | %Al$_2$O$_3$ | %Sol. SiO$_2$ | %F |
| | 1.4 | 29.20 | 1.25 | 0.58 | 0.95 | 2.50 |
| | 2.2 | 29.20 | 1.25 | 0.64 | 0.99 | 3.35 |
| | 3.5 | 28.00 | 1.07 | 0.45 | 0.96 | 4.05 |
| 4 | 0 | 29.75 | 1.90 | 0.77 | 0.94 | 1.80 |
| | 3.0 | 28.60 | 1.66 | 0.70 | 1.08 | 4.05 |
| | 3.6 | 27.80 | 1.58 | 0.70 | 1.12 | 4.50 |
| | 5.8 | 27.10 | 1.24 | 0.48 | 1.12 | 5.85 |
| 5 | 0 | 29.70 | 2.49 | 0.77 | 0.90 | 1.80 |
| | 3.3 | 27.94 | 2.07 | 0.74 | 1.04 | 4.05 |
| | 4.8 | 27.70 | 1.33 | 0.58 | 1.04 | 4.75 |
| | 6.3 | 27.05 | 1.08 | 0.45 | 1.12 | 5.50 |
| 6 | 0 | 29.66 | 2.90 | 0.77 | 0.88 | 1.85 |
| | 3.7 | 28.20 | 2.07 | 0.64 | 0.90 | 4.00 |
| | 4.6 | 27.90 | 1.77 | 0.51 | 1.00 | 4.50 |
| | 8.2 | 26.40 | 1.08 | 0.30 | 1.24 | 6.45 |

Additional testing was performed to determine the effect of increasing quantities of fluoride ion donating compounds on filter grade wet process acid. In obtaining the results listed in Table IV, the same test procedure described above was followed except 100 gram samples of filter grade wet process acid were used: no foreign compounds were added to sample 1; 3.0 grams of 49% HF solution (hydrofluoric acid) and 1.4 grams of NaF were added to sample 2 in each instance; and 4.0 grams of 49% HF solution and 2.0 grams NaF were added to sample 3 in each instance.

TABLE IV

| Filter Grade Wet Process Acid Sample Number | Sample Number | Solids Free Liquid Phase Analysis | | | | | |
|---|---|---|---|---|---|---|---|
| | | % P$_2$O$_5$ | % Al$_2$O$_3$ | % MgO | % Na$_2$O | % Sol. SiO$_2$ | % F |
| 1 | 1 | 29.05 | 0.77 | 0.49 | 0.078 | 1.20 | 2.25 |
| | 2 | 29.05 | 0.11 | 0.032 | 0.048 | 0.38 | 2.10 |
| | 3 | 28.90 | 0.084 | 0.065 | 0.15 | 0.16 | 1.53 |
| 2 | 1 | 27.98 | 0.85 | 0.40 | 0.069 | 1.11 | 2.18 |
| | 2 | 27.74 | 0.053 | 0.082 | 0.078 | 0.51 | 1.50 |
| | 3 | 27.60 | 0.041 | 0.060 | 0.23 | 0.11 | 1.50 |
| 3 | 1 | 29.04 | 0.86 | 0.45 | 0.082 | 0.99 | 2.20 |
| | 2 | 29.30 | 0.036 | 0.023 | 0.059 | 0.39 | 1.30 |
| | 3 | 29.24 | 0.026 | 0.018 | 0.14 | 0.14 | 1.37 |
| 4 | 1 | 28.34 | 1.11 | 0.43 | 0.082 | 0.90 | 2.35 |
| | 2 | 29.10 | 0.079 | 0.23 | 0.062 | 0.49 | 1.33 |
| | 3 | 29.90 | 0.062 | 0.12 | 0.13 | 0.40 | 1.43 |
| 5 | 1 | 28.80 | 1.03 | 0.40 | 0.073 | 0.95 | 2.50 |
| | 2 | 28.74 | 0.12 | 0.017 | 0.086 | 0.47 | 1.43 |
| | 3 | 28.46 | 0.068 | 0.0074 | 0.14 | 0.43 | 1.54 |
| 6 | 1 | 30.04 | 1.03 | 0.39 | 0.059 | 1.89 | 2.49 |
| | 2 | 30.00 | 0.11 | 0.022 | 0.10 | 0.49 | 1.51 |
| | 3 | 29.70 | 0.092 | 0.010 | 0.14 | 0.36 | 1.65 |
| 7 | 1 | 26.40 | 0.99 | 0.47 | 0.062 | 1.41 | 1.95 |
| | 2 | 26.90 | 0.080 | 0.066 | 0.079 | 0.88 | 1.07 |
| | 3 | 26.90 | 0.043 | 0.018 | 0.08 | 0.75 | 1.08 |
| 8 | 1 | 28.40 | 1.20 | 0.51 | 0.91 | 1.55 | 1.95 |
| | 2 | 29.30 | 0.15 | 0.040 | 0.11 | 0.83 | 1.23 |
| | 3 | 29.10 | 0.057 | 0.024 | 0.16 | 0.56 | 1.28 |
| 9 | 1 | 29.40 | 1.10 | 0.52 | 0.084 | 1.07 | 2.06 |
| | 2 | 29.14 | 0.10 | 0.041 | 0.051 | 0.51 | 1.40 |
| | 3 | 28.70 | 0.033 | 0.0025 | 0.072 | 0.28 | 1.41 |
| 10 | 1 | 28.64 | 1.09 | 0.50 | 0.094 | 1.48 | 2.30 |
| | 2 | 29.24 | 0.019 | 0.036 | 0.10 | 0.50 | 0.79 |
| | 3 | 28.50 | 0.014 | 0.022 | 0.16 | 0.39 | 1.18 |
| 11 | 1 | 28.20 | 1.05 | 0.58 | 0.076 | 1.23 | 2.06 |
| | 2 | 28.30 | 0.030 | 0.019 | 0.11 | 0.56 | 1.53 |
| | 3 | 28.30 | 0.047 | 0.10 | 0.069 | 0.63 | 1.40 |
| 12 | 1 | 27.00 | 0.99 | 0.52 | 0.093 | 1.11 | 2.06 |
| | 2 | 27.60 | 0.019 | 0.036 | 0.056 | 0.47 | 1.31 |
| | 3 | 28.00 | 0.014 | 0.011 | 0.097 | 0.25 | 1.34 |
| 13 | 1 | 29.00 | 1.01 | 0.48 | 0.067 | 1.11 | 2.06 |
| | 2 | 28.64 | 0.19 | 0.043 | 0.11 | 0.64 | 1.69 |
| | 3 | 28.14 | 0.061 | 0.032 | 0.23 | 0.43 | 1.97 |
| 14 | 1 | 24.46 | 0.87 | 0.43 | 0.15 | 1.11 | 2.03 |
| | 2 | 23.24 | 0.033 | 0.026 | 0.12 | 0.51 | 1.50 |
| | 3 | 23.80 | 0.0094 | 0.010 | 0.19 | 0.27 | 1.60 |

Table V sets forth the results of tests run to determine the effect of employing a mixture of fluoride ion donating compounds. In obtaining the data reported in Table V the testing procedure used in obtaining the data reported in Table IV was used, except with respect to sample 2, in each instance was added 3.0 grams 49% HF soluton and to sample 3, 3.0 grams HF solution and 1.4 grams NaF.

TABLE V

| Filter Grade Wet Process Acid Sample Number | Sample Number | Solids Free Liquid Phase Analysis | | | | | |
|---|---|---|---|---|---|---|---|
| | | % P$_2$O$_5$ | % MgO | % Al$_2$O$_3$ | % Na$_2$O | %Sol. SiO$_2$ | %F |
| 1 | 1 | 29.74 | 0.54 | 0.59 | 0.072 | 1.10 | 2.38 |
| | 2 | 29.20 | 0.14 | 0.39 | 0.055 | 1.87 | 2.68 |
| | 3 | 30.30 | 0.022 | 0.043 | 0.13 | 0.90 | 1.56 |
| 2 | 1 | 29.54 | 0.49 | 0.59 | 0.11 | 1.87 | 2.43 |
| | 2 | 28.84 | 0.16 | 0.41 | 0.060 | 2.09 | 2.81 |
| | 3 | 29.50 | 0.041 | 0.11 | 0.092 | 0.96 | 1.34 |
| 3 | 1 | 30.84 | 0.58 | 0.71 | 0.057 | 0.86 | 2.29 |
| | 2 | 29.84 | 0.54 | 0.47 | 0.069 | 1.12 | 3.50 |
| | 3 | 30.20 | 0.24 | 0.41 | 0.12 | 0.64 | 2.05 |
| 4 | 1 | 29.60 | 0.52 | 1.09 | 0.063 | 2.09 | 2.22 |
| | 2 | 28.20 | 0.44 | 0.99 | 0.076 | 2.11 | 2.94 |
| | 3 | 29.60 | 0.049 | 0.057 | 0.16 | 0.36 | 0.56 |
| 5 | 1 | 29.70 | 0.62 | 1.06 | 0.086 | 2.09 | 2.00 |
| | 2 | 29.00 | 0.27 | 0.40 | 0.091 | 2.11 | 2.44 |
| | 3 | 29.50 | 0.16 | 0.057 | 0.21 | 0.36 | 0.93 |
| 6 | 1 | 29.10 | 0.47 | 0.90 | 0.062 | 2.16 | 2.14 |
| | 2 | 28.60 | 0.33 | 0.76 | 0.082 | 2.04 | 2.91 |
| | 3 | 29.10 | 0.034 | 0.038 | 0.15 | 1.07 | 0.98 |
| 7 | 1 | 29.44 | 0.54 | 1.02 | 0.057 | 1.72 | 2.50 |
| | 2 | 28.44 | 0.022 | 0.033 | 0.061 | 2.10 | 2.57 |
| | 3 | 29.10 | 0.040 | 0.024 | 0.056 | 0.61 | 1.11 |
| 8 | 1 | 28.44 | 0.47 | 1.06 | 0.061 | 1.68 | 2.41 |
| | 2 | 27.84 | 0.19 | 0.52 | 0.082 | 1.92 | 2.88 |
| | 3 | 27.60 | 0.072 | 0.071 | 0.71 | 0.43 | 0.98 |

It is possible, according to one embodiment of the present invention, to add the fluoride ion donating compound to the wet process acid before filtering of by-product gypsum therefrom. However, this approach is not the preferred embodiment because silica in the acid competes with the aluminum ions for the fluoride ion and, therefore, more fluoride ions are required to precipitate impurities from the wet process acid. Also, the filtration rates are decreased when the acid is treated with hydrofluoric acid prior to filtration.

Generally, from the tests performed, it can be concluded that impurities will precipitate only when the ratio of fluoride ions to aluminum ions exceeds 3/1 and that when the ratio exceeds 6/1 the precipitation of impurities is less efficient.

Further, aluminum precipitation is limited by the amount of magnesium present and magnesium precipitation is limited by the amount of aluminum present. The ratio of aluminum ions to magnesium ions precipitated can generally vary between 1.1 and 2.0. It may be necessary, in some cases, to add alum or another aluminum ion donating compound (such as scrap aluminum, for example) to the wet process acid in order to attain the desired ion ratio set forth above. This addition can be effected either before or after filtration of the acid. Thus, for example, the alum can be added during the digestion of the phosphate rock by mineral acids and before filtration of the resulting wet process phosphoric acid. Conversely, in some cases magnesium ion donating compounds may need to be added to achieve the desired ratio.

To demonstrate the embodiment of the present invention wherein aluminum ion donating compounds are added for this purpose, the following experiment was performed. To 100 gm of base sample of wet process phosphoric acid (having the composition set forth in Table VI) was added 10.24 g of 49% HF solution. After storage for 24 hours at about 60° C. this acid was centrifuged to yield solids free acid, designated "No Alum Added" in Table VI. Another 100 gm of this base sample acid was admixed with the proper amount of alum, $Al_2(SO_4)_3 \cdot 18H_2O$ to adjust the $Al_2O_3:MgO$ mole ratio to 2. To this acid 10.24 gm of 49% HF solution was added and after storage for 24 hours at about 60° C. the acid was centrifuged to obtain the solids free acid designated "Alum Added" in Table VI.

As can be seen from a study of Table VI the addition of the alum to obtain the preferred mole ratio of $Al_2O_3:MgO$ provided greatly increased reduction of the $MgO:P_2O_5$ ratio in the acids treated with the fluoride ion donating compound.

TABLE VI

| Acid | %$P_2O_5$ | $MgO:P_2O_5$ | $Al_2O_5:P_2O_5$ |
|---|---|---|---|
| Base Sample | 31.00 | 0.0355 | 0.0168 |
| No Alum Added | 28.40 | 0.0187 | 0.0074 |
| Alum Added | 26.55 | 0.00377 | 0.0117 |

The crystalline compounds formed by the process of the subject invention, while difficult to analyze, have a stoichiometry ranging between $MgAl_2F_8$ and $MgAlF_5$ and it is believed that one of the dominant compounds can be represented by the formula $MgAl_2F_8$. This belief is supported by infrared spectral data obtained from samples of the precipitated solid phase. In order to obtain a sample of the solid phase for spectral analyses, the solids were washed with reagent grade phosphoric acid and then the phosphoric acid was extracted from the solids with $\eta$-butanol and then dried under a vacuum. The spectral data, including that the Al to F ratio is approximately 1:4, is set forth in Table VII.

TABLE VII

| | Observed Frequencies ($CM^{-1}$) | | |
|---|---|---|---|
| | Solids* | $KAlF_4$** | $RbAlF_4$** |
| Al—F Stretching: | 730 | 750 | 735 |
| | 600 | 600 | 585 |
| In-Plane and Out of Plane Bending: | 320 | 348 | 340 |

*CsI Pellet
**$KAlF_4$ and $RbAlF_4$ spectrum taken from: T. Saga, K. Ohavada, and M. Iwasaki, Journal of Chemical Physics, Vol. 61, No. 5, p. 1990, 1974.

Separation of the crystals containing unwanted Mg and Al ions can best be effected if the crystals are permitted to grow to a size at which they will readily settle. Those skilled in the art are familiar with techniques for growing crystals from solutions and may adapt those principles to effect either batch or continuous crystallization of the Mg and Al containing impurities so the purified wet process acid may be separated for further use. See, e.g. A. Van Hook, *Crystallization: Theory and Practice*, Reinhld, New York, 1961.

The wet process acid produced by the above described techniques is a higher quality acid than produced by conventional wet process acid processes, admits of easier concentration by evaporator techniques, produces a higher $P_2O_5$ acid in the evaporator with less sludge formed, and provides an acid which can be more easily retracted with ammonia and other compounds to produce useful products.

What is claimed is:

1. A method for removing magnesium and aluminum impurities from wet process phosphoric acid without subjecting said acid to treatment for silicon removal, consisting essentially of:

adding a fluoride ion donating compound to said unconcentrated wet process phosphoric acid, said fluoride ion donating compound being added in a quantity sufficient to effect an initial fluorine to aluminum ion ratio of from about 3.5/1 to about 7/1; and precipitating the resulting insoluble crystalline compounds and separating same from said wet process phosphoric acid.

2. The method of claim 1 wherein said fluoride ion donating compound is selected from the group consisting of hydrofluoric acid, sodium fluoride, sodium bifluoride, ammonium fluoride and ammonium bifluoride.

3. The method of claim 2 wherein said fluoride ion donating compound is hydrofluoric acid.

4. The method of claim 1, wherein said fluoride ion is added after filtration of the acidulated phosphate rock to remove solids formed during acidulation and before evaporation of water from said acid to concentrate the acid.

5. The method of claim 4, including the steps of:

adding the fluoride donating compound to the wet process acid in a manner which promotes the growth of crystals which will readily settle and can be easily removed; and separating the liquid and solid phases to produce a wet process phosphoric acid having lesser and controlled amounts of Mg and Al containing impurities.

6. The method of claim 5, wherein the fluoride ion donating compound is hydrofluoric acid.

7. The method of claim 1 wherein said fluoride ion donating compound is added to unconcentrated wet process phosphoric acid prior to the filtration thereof to remove the solids formed during acidulation.

8. A method of removing magnesium and aluminum impurities from wet process phosphoric acid without subjecting said acid to treatment for silicon removal, which method comprises:

adding to said unconcentrated wet process acid a sufficient quantity of an aluminum ion donating compound to bring the Al ion to Mg ion ratio to a range of from about 1.1/1 to about 2.0/1; and adding a sufficient quantity of a fluoride ion donating compound to raise the fluoride ion to Al ion ratio to a range of from about 3.5/1 to about 7/1.

9. The method of claim 8, including the steps of:

promoting the growth of crystalline compounds containing Mg, Al and F in the unconcentrated wet process acid after addition of the aluminum ion donating compound and the fluoride ion donating compound; and separating the liquid and solid phases to produce a liquid having reduced levels of Mg and Al impurities.

10. The method of claim 8 wherein said fluoride ion donating compound is selected from the group consisting of hydrofluoric acid, sodium fluoride, sodium bifluoride, ammonium fluoride and ammonium bifluoride.

11. A method of removing magnesium and aluminum impurities from wet process phosphoric acid without subjecting said acid to treatment for silicon removal, which method consists essentially of:

adding a fluoride ion donating compound to filter grade wet process phosphoric acid to provide approximately 4 fluoride ions for each aluminum ion to permit the formation of insoluble crystalline compounds of Mg, Al and F.

12. The method of claim 11 wherein said fluoride ion donating compound is selected from the group consisting of hydrofluoric acid, sodium fluoride, sodium bifluoride, ammonium fluoride and ammonium bifluoride.

13. The method of claim 12 wherein said fluoride ion donating compound is hydrofluoric acid.

14. The method of claim 11, including the steps of:
treating the wet process acid to promote growth of relatively large crystals which will readily settle; and
separating the liquid and solid phases to produce a wet process phosphoric acid having reduced levels of dissolved Mg and Al impurities.

15. The method of claim 11, including the step of:
adding sufficient alum to bring the Al ion to Mg ion ratio to between about 1.1/1 and 2.0/1.

16. The method of claim 15, wherein said alum is added during digestion of the phosphate rock by a mineral acid and before filtration of the solids formed during digestion from the wet process phosphoric acid.

* * * * *